United States Patent [19]
Guillet et al.

[11] 3,860,538
[45] Jan. 14, 1975

[54] PHOTODEGRADABLE POLYMER MASTERBATCHES

[76] Inventors: James Edwin Guillet, 31 Sagebrush Ln., Don Mills, Ontario, Canada; Harvey Graham Troth, Liphook, England

[22] Filed: Apr. 9, 1973

[21] Appl. No.: 349,048

[30] Foreign Application Priority Data
Apr. 7, 1972  Great Britain ................ 16076/72
Sept. 11, 1972  Canada ............................ 151353

[52] U.S. Cl.... 260/2.5 HA, 204/159.14, 260/2.5 H, 260/2.5 HB, 260/63 R, 260/63 CQ, 260/836, 260/857 UN, 260/862, 260/874, 260/887, 260/892, 260/897, 260/898
[51] Int. Cl. ............................................ C08c 17/08
[58] Field of Search .......... 260/DIG. 43, 874, 2.5 H, 260/2.5 HA, 2.5 HB, 887, 892, 897, 898, 899, 901, 63 R, 63 CQ, 857 UN, 836, 859 R, 867; 204/159.14

[56] References Cited
UNITED STATES PATENTS

| | | | |
|---|---|---|---|
| 3,632,493 | 1/1972 | Rogers, Jr. | 204/159.14 |
| 3,676,401 | 7/1972 | Henry | 260/63 CQ |
| 3,753,952 | 8/1973 | Guillet | 260/DIG. 43 |

Primary Examiner—Melvyn I. Marquis
Attorney, Agent, or Firm—Ridout & Maybee

[57] ABSTRACT

Polymer compositions photodegradable upon exposure to ultraviolet radiation comprise a blend of a synthetic polymer and a ketone copolymer, containing from about 0.01 to about 5 weight per cent carbonyl groups.

15 Claims, No Drawings

PHOTODEGRADABLE POLYMER MASTERBATCHES

FIELD OF THE INVENTION

This invention relates to polymeric compositions which are photodegradable on exposure to ultraviolet light.

BRIEF DESCRIPTION OF THE PRIOR ART.

There have previously been disclosed (see for example Bel. Pat. No. 766,320 and Bel. Pat. No. 766,161) certain solid polymers and copolymers containing keto carbonyl groups which are photodegradable on exposure to ultraviolet light, e.g., on exposure to direct sunlight in an outdoor environment. These polymers may be addition copolymers of a vinylidene unsaturated monomer containing in the polymer backbone a minor amount of a ketonic structural unit of general formula

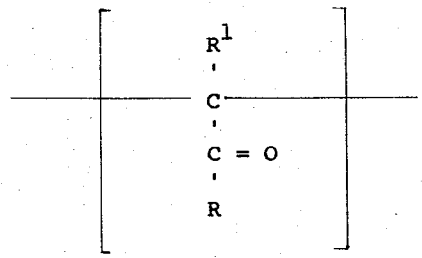

where $R^1$ represents a hydrogen atom or a lower alkyl group of 1-6 carbon atoms, and R represents an alkyl, alkaryl, alkenyl or aryl group, having from 1-9 carbon atoms. Such copolymers can be made by copolymerizing a vinylidene unsaturated monomer (ethylene, styrene etc.) with a suitable unsaturated ketone. Alternatively, the polymer may be a condensation polymer containing in the backbone a minor amount of the aforementioned keto containing structural unit, or a minor amount of ketone carbonyl group in the backbone of the copolymer. Such condensation copolymers can be prepared by condensation copolymerizing keto substituted dibasic acids, diamines, glycols, diisocyanates, etc. with difunctional monomers condensable therewith.

SUMMARY OF THE INVENTION

An object of the present invention is to provide novel polymeric compositions.

A further object is to provide polymer compositions or blends photodegradable upon exposure to ultraviolet radiation.

Other objects will be apparent from the following description.

The present invention is based upon the discovery that solid polymers rendered photodegradable on exposure to ultraviolet light by the presence of keto carbonyl groups in their structures can be blended with other synthetic polymers, and thereby render the resulting polymer blend U.V. photodegradable.

Thus the present invention provides blends of ketone copolymers and synthetic polymers, the blends as a whole being U.V. photodegradable. The blends contain from about 0.01 weight per cent to about 5 weight per cent keto carbonyl groups, based upon the total weight of synthetic polymer and ketone copolymer.

DESCRIPTION OF THE PREFERRED EMBODIMENTS

Preferably, the synthetic polymer or polymers are compatible with the ketone copolymer or copolymers. By "compatible polymer" as used herein is meant polymers which can be blended together in the desired proportions to give a polymer blend of reasonable strength, toughness, and coherence. In contrast, blends of incompatible polymers, or blends of polymers in proportions at which they are incompatible, are non-tough, cheesey in nature.

Preferably also, the synthetic polymer constitutes at least half of the blend. Therefore a preferred embodiment of the invention is a polymeric composition comprising a blend of from 99-50 per cent by weight of at least one synthetic polymer, and from 1-50 per cent by weight of at least one ketone copolymer compatible therewith, which is photodegradable on exposure to ultraviolet light.

The synthetic polymers of the compositions of the invention can be chosen from a very wide variety of known polymeric materials. They can be addition polymers and copolymers of one or more vinylidene monomers broadly represented by the general formula

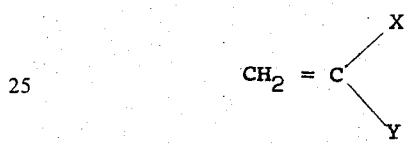

where X is selected from the groups hydrogen, lower alkyl, and halogen, and Y is selected from the groups hydrogen, lower alkyl, aryl, substituted aryl carboxylic acid, carboxylic acid lower alkyl ester, lower acyloxy, halogen, cyano, alicyclic of not more than 8 carbon atoms, lower alkoxy, amido and lower alkenyl.

The term "lower" when used herein in connection with chemical groups such as alkyl, alkoxy, acyloxy and alkenyl refers to such groups containing up to 6 carbon atoms.

Examples of such vinylidene monomers include ethylene, propylene, butene-1, pentene-1, 2-methylbutene-1, 4-methylpentene-1, isobutylene, styrene, chlorostyrene, methylstyrene, bromostyrene, α-methylstyrene, acrylic acid, methacrylic acid, methyl acrylate, methyl methacrylate, ethyl acrylate, ethyl methacrylate, ethyl ethacrylate, vinyl acetate, vinyl propionate, vinyl butyrate, vinyl chloride, vinyl fluoride, vinylidene chloride, vinylidene fluoride, acrylonitrile, methacrylonitrile, vinyl cyclohexene-3, vinyl methyl ether, vinyl ethyl ether, vinyl isobutyl ether, acrylamide, methacrylamide, N-alkyl-substituted acrylamides and methacrylamides, butadiene, isoprene, pentadiene and hexadiene.

For blending with such addition polymers to make the U.V. photodegradable compositions of the present invention, it is preferred to choose an addition copolymer of a similar vinylidene monomer and an unsaturated ketone, in minor proportion. It is especially preferred to use a minor proportion of a U.V. photodegradable copolymer based upon one of the monomers of the synthetic polymer, since such combinations are generally compatible over a wide range of relative proportions, so that one has a greater degree of flexibility in formulation. Thus, for example, among the especially preferred embodiments of the invention are such compositions as blends of polystyrene (major proportion) and keto-carbonyl containing copolymers of styrene (minor proportion), blends of polymethylmethacrylate (major proportion) and keto-carbonyl containing copolymers of methyl-methacrylate (minor proportion), blends of polymethylacrylate (major proportion) and keto-carbonyl containing copolymers of methylacrylate (minor proportion), and blends of polyethylene (major proportion) and keto carbonyl containing ethylene - unsaturated ketone copolymers (minor proportion), being macro-molecular, the U.V. photodegradable ketone copolymers are not extractable from the polymer blends.

The synthetic polymers of the compositions of the present invention can also be condensation polymers or copolymers, for example polyamides, polyesters, polyurethanes, polyethers, polyepoxides, polyamide esters, polyimides, poly (amide-imides), polyureas, polyamino-acids, etc. U.V. photodegradable compositions with good physical properties can be made from these by blending them with a U.V. photodegradable keto carbonyl containing copolymer in a minor proportion at which the keto carbonyl containing copolymer is compatible with the synthetic polymer. In this case also, best results are obtained by using a keto carbonyl containing polymer derived from at least one of the monomers from which the synthethic polymer is derived.

An example of such a preferred composition is a blend of hexamethylene diamine - adipic acid copolymers (nylon - major proportion) with keto-containing copolymers of hexamethylene diamine and adipic acid (minor proportion). Useful U.V. photodegradable condensation copolymers are those disclosed in Belgian Pat. No. 766,161.

The keto copolymers used in minor proportion in the preferred compositions of the present invention are themselves photodegradable on exposure to U.V. radiation. They may contain from about 0.01 – 10 weight per cent, preferably from about 0.01 – 5 weight per cent, and most preferably 0.02 – 2 weight per cent of ketone carbonyl group. They are compatible with the synthetic polymer with which they are to be blended. In the case of addition keto copolymers, the keto groups are located in a side chain at a position immediately adjacent to the backbone polymeric chain. In the case of condensation keto copolymers, the keto groups may be located either in a side chain as aforesaid, or less preferably in the polymer backbone. The keto copolymer is blended with the synthetic polymer so as to give a polymeric composition containing not more than 3 weight per cent keto groups, in these preferred compositions.

U.V. photodegradable compositions can also be prepared by mixing photodegradable keto containing addition polymers with condensation polymers, and U.V. photodegradable keto containing condensation polymers with addition polymers.

A further example is U.V. photodegradable polyvinyl alcohol. This is prepared by blending polymers of vinyl acetate with keto containing polymers of vinyl acetate, and then hydrolysing the blend. Alternatively, hydrolysed vinyl acetate polymers are blended with hydrolysed ketone containing polymers of vinyl acetate, giving vinyl alcohol polymers.

The U.V. photodegradable addition keto copolymers used for blending with synthetic polymers in compositions of the present invention, and their methods of preparation are described in Belgian Pat. No. 766,320. In general they comprise copolymers of at least one unsaturated ketone of general formula

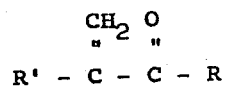

where R' represents a hydrogen atom or a lower alkyl group, and R represents an alkyl, alkaryl, alkenyl or aryl group, having from 1 to 9 carbon atoms, and at least one vinylidene monomer of general formula

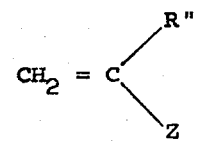

where R'' represents hydrogen, halogen or an alkyl group, and Z is a functional group such as aryl, substituted aryl, carboxylic acid, lower alkyl carboxylate, lower alkyl, lower alkenyl, hydrogen, halogen, nitrile, lower acyloxy, lower alkoxy or amido, the relative proportions being chosen so as to produce a solid copolymer containing from about 0.01 to about 10 weight per cent keto carbonyl content derived from said unsaturated ketone. The copolymers thus contain the structural unit

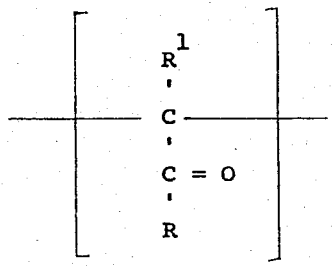

which is responsible for the photodegradability on exposure to ultraviolet radiation.

Examples of suitable unsaturated ketones include methyl vinyl ketone, ethyl vinyl ketone, propyl vinyl ketone, isopropyl vinyl ketone, butyl vinyl ketone, methyl isopropenyl ketone, ethyl isopropenyl ketone, methyl isobutenyl ketone, phenyl vinyl ketone, phenyl isopropenyl ketone and the like.

Examples of suitable vinylidene monomers include ethylene, styrene, methyl acrylate, methyl methacrylate, vinyl acetate, methacrylonitrile, acrylonitrile, vinyl chloride, acrylic acid, methacrylic acid, chlorostyrene, α-methylstyrene, vinyl toluene butadiene, isopene and the like. Especially preferred are ethylene, styrene, methyl methacrylate and methyl acrylate.

The methods of preparing copolymers of unsaturated ketones and vinylidene monomers are known in the art, with respect to the specific monomers chosen. Low or high pressure processes can be chosen. The processes may comprise solution, suspension, bulk, emulsion, free radical, gas phase, etc., polymerization. The polymers may be prepared in batch autoclaves, or in continuous stirred reactors or in tubular reactors. The polymers can be recovered from the polymerization system by methods known for the polymers of the vinylidene monomers chosen.

This present invention is based upon the discovery that when U.V. photodegradable keto containing polymers are used in blends with conventional polymers, the entire blend composition is rendered U.V. photodegradable. The reason for and chemical mechanism of this phenomenon is not at present fully understood. However, the practical and economic advantages of the present invention are extremely significant. Instead of having to synthesis an entire novel composition in order to have a U.V. photodegradable plastic, one now needs only to prepare small amounts of the keto copolymer and use it with large amounts of conventional synthetic polymers already available cheaply and in large quantities.

It is preferred to use from 3–30 weight per cent of keto containing polymer in the composition of the present invention along with 97–70 weight per cent of synthetic polymer. Most preferred is an amount of from 10–25 weight per cent of keto containing polymer and from 90–75 weight per cent of synthetic polymer.

The method of blending the polymers to form the compositions of the invention can be any of the methods known in the art as suitable for preparing intimate admixtures of polymeric materials. These include dry mixing in a mixer, on a mill, on a Banbury mixer, or solution blending, or hot melt blending, etc. The method does not appear to be critical, provided that an intimate admixture of the polymeric materials is achieved.

The polymer blends may, in some cases, also be produced by a two stage polymerization process. For example, in the bulk polymerization of styrene, styrene monomer may be incompletely homopolymerized and a copolymerizable ketone added and copolymerized with the remaining styrene monomer. Still another method of producing the blends which can be used in some polymerization systems is to dissolve the keto containing polymer in the monomer or monomers used to make the base polymer, and polymerize the latter.

The polymer blends of the invention are generally useful in applications where corresponding polymeric materials have previously been used. They are specially useful in applications which are likely to become litter, such as wrapping films, bottles, cups, trays, containers, cigar holders, fibres, sheets, twines, disposable cutlery, plates, dishes and the like.

A particularly useful application of the U.V. photodegradable polymer blends of the present invention is in the preparation of foams and foam articles. For example, blends which are predominantly polystyrene such as blends of polystyrene with a styrene-methylvinyl ketone copolymer, styrene-phenylvinyl ketone copolymer or styrene-methylisopropenyl ketone copolymer, can be formed into plastic foams and foam articles by known methods generally applied to commercial polystyrenes. For example, the foams can be used to produce such articles as dunnage, sheets, trays, disposable dishes, meat trays, egg cartons, cups and the like.

The polymer blends which are used to produce the foams and foam articles may be produced in several ways. For example, the base polymer and the keto containing polymer may be blended in a molten condition. The melt so formed can then be formed into beads which are impregnated with volatile liquid, such as pentane, as a blowing agent. The blowing agent can be incorporated either in the process of forming the beads, or by soaking formed beads in the blowing agent. The beads are molded to the desired shape with heating to soften the polymer and vaporize the blowing agent which expands the blend, resulting in the fusing together of the beads and the formation of a foam molded article.

Another method of foaming the polymer blend is the so called "direct gasing" method in which a blowing agent is added to the melt in an extrusion operation, thereby foaming the polymer and forming foamed extruded articles such as foamed sheets.

Foam can also be made by whipping gas, generally air, into a hot mass of the blend before it sets. Alternatively, gas can be introduced into the plastic mass, and the mass can be heated to expand the gas and thereby foam the plastic material.

The densities of the foams produced can be varied by known methods and in general one can prepare foams of a density in accordance with those generally known for the base polymers themselves.

The invention will be further described with reference to specific examples.

EXAMPLE 1

A copolymer was prepared of styrene (95 wt.%) and phenyl vinyl ketone (5 wt.%), by heating a mixture of the monomers in the desired proportion in a solvent. The resulting copolymers were extracted. Blends of these polymers were prepared with polystyrene resin, by dry mixing of the solid, granulated polymers on a Brabender mixer, and self-supporting films were pressed from the resulting compositions. Three such compositions were prepared, containing respectively 10%, 30%, and 50% by weight of styrene-phenyl vinyl ketone copolymer, the balance being polystyrene. The films were exposed to direct sunlight in an outdoor environment. A film of the same polystyrene, without blending with the copolymer, was similarly prepared and exposed.

After 1 hour's exposure, all of the films from compositions according to the invention had changed to a brittle condition. No change was apparent in the polystyrene film.

EXAMPLE 2

A series of copolymers of styrene and methyl isopropenyl ketone (MIPK) in different amounts were prepared by known methods, and blended in minor proportions with samples of commercially available polystyrene (Carinex). Blending was carried out by mixing the polymers, dry, in a Brabender mixer. Films of thickness about 0.014 cms were compression molded from these blended compositions, and subjected to weathering tests. The results were compared with results obtained by similar testing of similar films of the polystyrene Carinex containing no ketone-containing copolymer. The copolymers alone were also tested similarly.

The weathering tests were conducted by placing the samples in a special F.S.B. ultraviolet accelerometer, which simulates ultraviolet radiation of direct sunlight, but accelerates the effects thereof. Measurements of intrinsic viscosity of the polymer films after various periods of time were taken. A decrease in intrinsic viscosity indicates a decrease in molecular weight, i.e. chain scission and degradation of the polymer. An intrinsic viscosity of about 0.5 or less indicates a brittle polymer.

The results are shown in Table 1.

TABLE I

| Styrene - MIPK copolymer | | Polystyrene Parts by weight in composition | initially | after 16 hours exposed | after 40 hours exposure |
|---|---|---|---|---|---|
| Wt. % MIPK | Parts by weight copolymer in composition | | | | |
| — | — | 100 | 0.94 | 0.96 | 0.88 |
| 1 | 100 | — | 0.86 | 0.35 | 0.25 |

TABLE 1—Continued

| Wt. % MIPK | Styrene - MIPK copolymer Parts by weight copolymer in composition | Polystyrene Parts by weight in composition | initially | after 16 hours exposed | after 40 hours exposure |
|---|---|---|---|---|---|
| 1 | 20 | 100 | 0.90 | 0.71 | 0.57 |
| 3 | 100 | — | 0.86 | 0.29 | 0.24 |
| 3 | 20 | 100 | 0.86 | 0.52 | 0.43 |
| 5 | 100 | — | 0.88 | 0.22 | 0.19 |
| 5 | 20 | 100 | 0.81 | 0.48 | 0.41 |

The following Example 3 is a specific example of foamed polymer blends of the invention.

EXAMPLE 3

A copolymer was prepared of styrene (95 wt.%) and methylisopropenyl ketone (5 wt.%) by normal suspension polymerization techniques. This copolymer masterbatch was blended in various proportions with a commercially available grade of polystyrene (Carinex), and the blend formed into beads, treated with blowing agent and made into foamed sheets. The photodegradability of the foams was tested by exposing the sheets in an outdoor environment in Toronto, Canada, in the month of July, for various periods of time. Degradation of the polymer blends was followed by determination of its molecular weight by viscosity measurements, on solutions of the polymer blends in toluene at 30°C. The results are given in Table 2.

TABLE 2

| | SAMPLE NO. 3 | SAMPLE NO. 4 | SAMPLE NO. 5 | SAMPLE NO. 6 |
|---|---|---|---|---|
| Parts by weight masterbatch copolymer | 10 | 20 | 30 | 100 |
| Parts by weight Carinex polystyrene. | 90 | 80 | 70 | 0 |
| % Methyl isopropenyl ketone in blend | 0.5 | 1.0 | 1.5 | 5.0 |
| Molecular weight after 0 days exposure | 255,000 | 252,500 | 252,500 | 237,500 |
| Molecular weight after 4 days exposure | 170,000 | 147,500 | 112,500 | 51,250 |
| Molecular weight after 7 days exposure | 152,000 | 177,500 | 98,750 | 48,750 |
| Molecular weight after 11 days exposure | 125,000 | 97,500 | 75,000 | 31,250 |
| Molecular weight after 18 days exposure | 101,250 | 80,000 | 58,750 | |
| Molecular weight after 25 days exposure | 98,750 | 75,000 | | |

EXAMPLE 4

In this example, a blend of polyethylene and ethylenemethyl isopropenyl ketone copolymer was prepared and tested for U.V. photodegradability.

A blend was prepared by the physical mixing in granular form of 4 g. of commercial low density polyethylene with 1 g. of an ethylene-methylisopropenyl ketone copolymer containing 9.5% by weight methylisopropenyl ketone and produced using a standard high pressure polymerization process. After mixing, the sample was pressed in a Carver press at 130°C for 2 min. The sheet formed was broken into granules and the mixing and pressing steps were repeated three times. The blend was then compression molded into a film 0.25 mm thick, as was a sample of the base polyethylene to serve as a control.

The two films were irradiated in a U.V. accelerometer. After 180 hrs. irradiation, the film made from the blend had become brittle and broke on flexing through 180°, whereas the control appeared unaffected by the radiation.

Essentially the same results were obtained when an ethylene-methyl vinyl ketone copolymer was used instead of the ethylene-methyl-isopropenyl ketone copolymer.

EXAMPLE 5

This example was carried out in the same manner as Example 4, except that the polyethylene sample was a high density polyethylene. A blend was made with 0.5 g. of the same ethylene-methylisopropenyl ketone copolymer and 4 g. of Marlex 6050 polyethylene.

The films were irradiated for 150 hrs. in the U.V. accelerator, after which the film prepared from the blend was brittle and broke on flexing through 180° whereas the control film appeared to be unaffected.

EXAMPLE 6

A copolymer was prepared of styrene (95wt %) and methyl isopropenyl ketone (5wt %) by normal suspension polymerization techniques. 20 parts by weight of this copolymer masterbatch was blended with 80 parts of a commercial impact polystyrene and pressed into sheets 12mil thick. A similar sheet was made containing no ketone polymer. The two sheets were weathered in England during July. The blend required 40 days to be become brittle whereas the similar sheet containing no ketone polymer required 120 days to reach the same state of brittleness.

Whilst it is preferred that the blends comprise a major proportion of base polymer and a minor proportion of U.V. photodegradable keto carbonyl containing polymer, this is not absolutely essential in achieving a photodegradable polymer blend. The keto containing polymer can constitute the major proportion of the blend. For reasonably fast rates of degradation, however, it is preferred that the final blend contain at least 0.01 weight per cent keto carbonyl group, preferably at least 0.1 weight per cent. It is preferred not to exceed 5.0 weight per cent keto carbonyl content, preferably not to exceed 1 per cent by weight.

While blends of compatible polymers are preferred for most applications, incompatible blends of the base polymer with U.V. photodegradable keto carbonyl containing polymer, which blends are also U.V. photodegradable, are also a part of the invention. Such blends find utility in applications where strength of the blended polymers themselves are not important, e.g. as fillers, or in applications where the blend is merely a component of a system, e.g., in adhesive formulations. Blends of different types of polymers, one of which is U.V. photodegradable and contains ketone groups as aforesaid, are within the scope of this invention also. Examples of these are impact polystyrenes, comprising blends of styrene-ketone copolymers and rubbery polymers, ABS resins, MBS resins and the like, prepared of similar blends.

It is to be understood that the blends and articles with which this invention is concerned may contain additives or be otherwise treated to delay or retard photodegradation, so that the blend, or article prepared from the blend, does not photodegrade significantly if exposed to U.V. light as soon as it has been produced. Thus, for example, it may be desirable to add a U.V. absorber which prevents a significant degree of such photodegradation of the blend for a period of time. However, once the protective effect of such additive decreases or disappears the product will be photodegradable. In other words, blends containing such additives or otherwise protectively treated are considered to be photodegradable in accordance with the invention although this property may not be apparent until the protective effect of the additive or treatment decreases or disappears.

Preparation of blend compositions according to this invention provides a means of obtaining U.V. photodegradable polymer composition comprising polymers which cannot be prepared in U.V. photodegradable form by copolymerization with an unsaturated ketone. Such polymers include besides high density polyethylene noted above, polypropylene, crystalline polystyrene, polybutene-1, polypentene-1, polyhexene-1, poly(4-methylpentene-1), and the like higher 1-olefins, straight and branched chain, which can only be satisfactorily prepared using Ziegler-type catalysts. Such catalysts will not polymerize or copolymerize ketone monomers to any significant extent. Such polymers can be made into U.V. photodegradable compositions by blending with a photodegradable keto-containing copolymer prepared by other methods, which is compatible with such polymers.

It should also be noted that carbon monoxide copolymers, although photodegradable, are not ketone copolymers according to this invention.

What we claim as our invention is:

1. A polymeric composition photodegradable on exposure to ultraviolet radiation, said composition comprising:
   a. a major proportion of an addition polymer or copolymer of one or more vinylidene monomers represented by the general formula

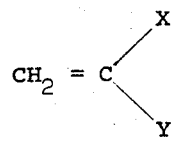

where X is selected from the groups hydrogen, lower alkyl and halogen, and Y is selected from the groups hydrogen, lower alkyl, aryl, substituted aryl, carboxylic acid, carboxylic acid lower alkyl ester, hydroxyl, lower acyloxy, halogen, cyano, alicyclic of not more that 8 carbon atoms, lower alkoxy, amido and lower alkenyl; and b. a minor proportion of a ketone copolymer of at least one unsaturated ketone of the general formula

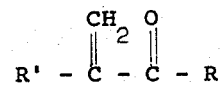

where R' represents hydrogen or a lower alkyl group, and R represents an alkyl, alkaryl, alkenyl or aryl group, having from 1 to 9 carbon atoms, and at least one vinylidene monomer of the general formula

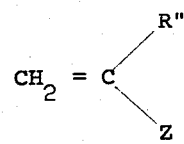

where R'' represents hydrogen, halogen or an alkyl group, and Z is a functional group selected from aryl, substituted aryl, carboxylic acid, lower alkyl carboxylate, lower alkyl, lower alkenyl, hydrogen, halogen, nitrile, lower acyloxy, lower alkoxy and amido;

the amount of keto carbonyl groups in the composition being from about 0.01 weight percent to about 5 weight percent, based upon the total weight of addition polymer and ketone copolymer in the composition.

2. The composition of claim 1 wherein the addition polymer is compatible with the ketone copolymer.

3. The composition of claim 2 wherein the ketone copolymer contains from about 0.01 to about 10 weight per cent of ketone carbonyl groups.

4. The composition of claim 3 wherein the ketone copolymer and the addition polymer are polymers of the same vinylidene monomer.

5. The composition of claim 4 comprising 3–30 weight percent of ketone copolymer and 97–70 weight per cent of addition polymer.

6. The composition of claim 4 wherein the vinylidene monomer is selected from ethylene, styrene, methyl acrylate, methyl methacrylate, vinyl acetate, methacrylonitrile, acrylonitrile, vinyl chloride, acrylic acid, methacrylic acid, chlorostyrene, α-methylstyrene, vinyl toluene and butadiene.

7. The composition of claim 5 wherein the ketone copolymer is a copolymer of a ketone selected from methyl vinyl ketone, ethyl vinyl ketone, propyl vinyl ketone, isopropylvinyl ketone, butyl vinyl ketone, methyl isopropenyl ketone, ethyl isopropenyl ketone, methyl isobutenyl ketone, phenyl vinyl ketone and phenyl isopropenyl ketone.

8. Photodegradable polymeric compositions comprising from 90–75 weight per cent of polystyrene and from 10–25 weight per cent of a copolymer of styrene and an unsaturated ketone selected from methyl vinyl ketone, phenyl vinyl ketone, phenyl isopropenyl ketone and methyl isopropenyl ketone, said copolymer containing from 0.01 to 3 weight per cent keto carbonyl groups.

9. Plastic foams made of the polymeric composition of claim 8.

10. Photodegradable polymeric compositions comprising from 90–75 weight per cent of polyethylene and from 10–25 weight per cent of a copolymer of ethylene and an unsaturated ketone selected from methyl vinyl ketone, phenyl vinyl ketone, phenyl isopropenyl ketone and methyl isopropenyl ketone, said copolymer containing from 0.01 to 5 weight per cent keto carbonyl groups.

11. The composition of claim 10 wherein the polyethylene is low density polyethylene.

12. The composition of claim 10 wherein the polyethylene is high density polyethylene.

13. A polymeric composition photodegradable on exposure to ultraviolet radiation, said composition comprising a condensation copolymer selected from polyamides, polyesters, polyurethanes, polyethers, polyepoxides, polyamide esters, polyimides, poly(amideimides), polyureas and polyamino-acids, and at least one ketone copolymer compatible therewith, the amount of keto carbonyl groups in the composition being from about 0.01 weight percent to about 5 weight percent, based upon the total weight of condensation copolymer and a ketone copolymer in the composition.

14. The composition of claim 13 comprising a major proportion of synthetic condensation polymer and a minor proportion of keto carbonyl containing polymer derived from at least one of the monomers from which the synthetic condensation polymer is derived.

15. A polymeric composition photodegradable upon exposure to ultraviolet radiation, said composition comprising polyethylene and a copolymer of ethylene and methyl vinyl ketone, the polyethylene comprising a major proportion of the composition and the copolymer containing from 0.01 to 5 weight per cent keto carbonyl groups.

* * * * *